June 9, 1942. R. L. BRANDT 2,285,390
SYSTEM FOR MANUFACTURING SULPHONIC ACIDS
Filed Nov. 8, 1938
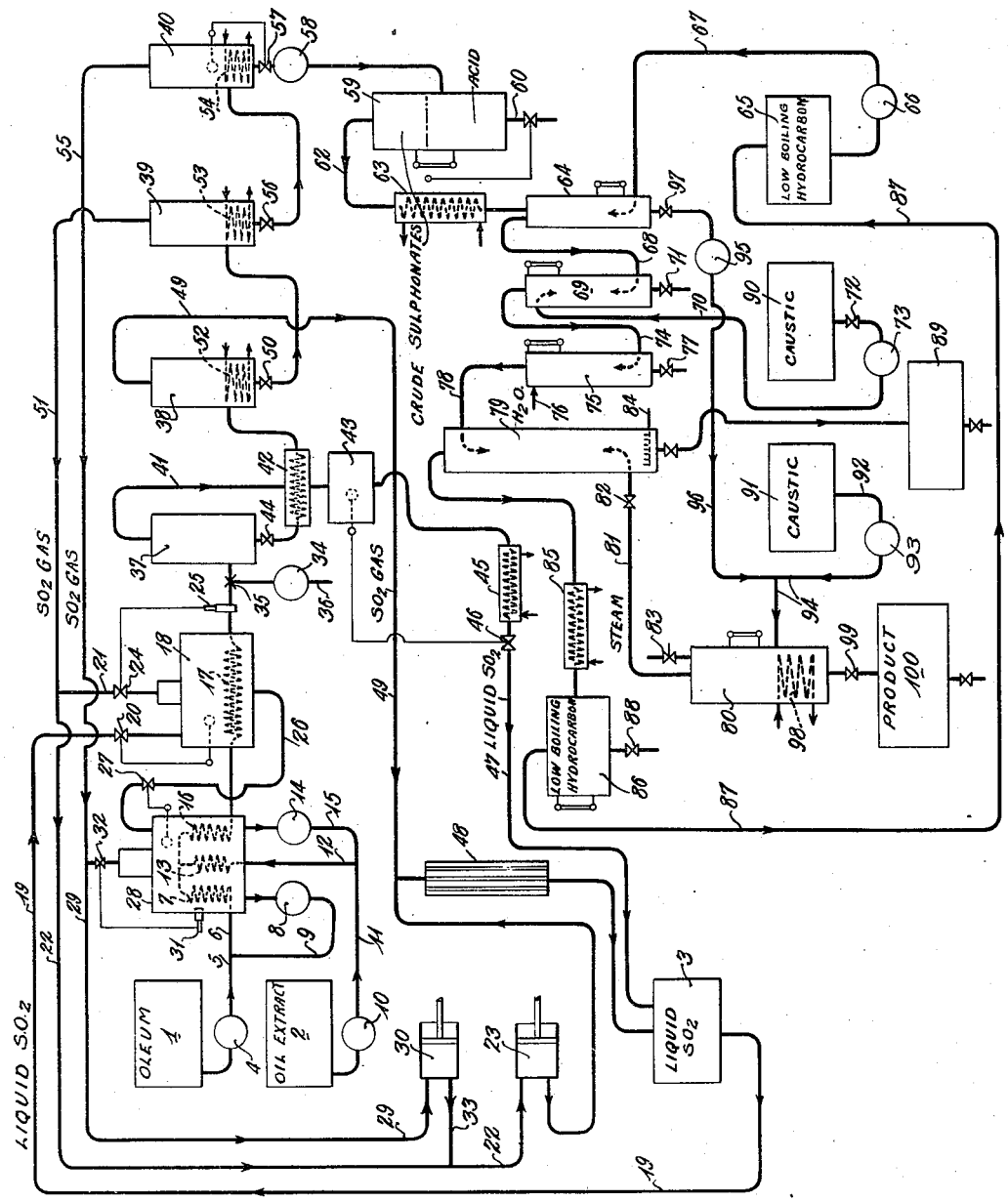
Inventor
Robert L. Brandt
By Stevens & Davis
Attorneys Patented June 9, 1942

2,285,390

UNITED STATES PATENT OFFICE 2,285,390

SYSTEM FOR MANUFACTURING SULPHONIC ACIDS

Robert L. Brandt, New York, N. Y., assignor to Colgate-Palmolive-Peet Company, Jersey City, N. J., a corporation of Delaware Application November 8, 1938, Serial No. 239,553

13 Claims. (Cl. 260—504)

This invention relates to a method and apparatus for the sulphonation of materials of a hydrocarbon nature in a manner that will produce products of unusual purity, on a commercial scale, and without permitting side reactions to occur which will injure the quality or appearance of the product.

In previous applications of this same inventor, several methods of preparing sulphonated organic compounds have been disclosed in which the sulphonates were prepared in solution in liquid sulphur dioxide so as to obtain products of unusually high quality and to minimize the formation of undesirable products. Thus, for example, in application Serial Number 117,096, filed December 21, 1936, now Patent No. 2,149,-661, a process is described for the treatment of a liquid sulphur dioxide extract of a mineral oil, preferably obtainable from a naphthene base crude distillate, according to which the extract was treated with oleum while in solution in liquid sulphur dioxide and the product subsequently purified so that a highly desirable detergent and wetting agent resulted. Another application of this same inventor, Serial Number 138,463, filed April 22, 1937, now Patent No. 2,149,662, describes certain modifications of the first mentioned process whereby the products obtained, while of the same general nature, are even more desirable. Another application, Serial Number 211,946, filed June 4, 1938, describes a similar process in which the sulphonation of the petroleum extract takes place in a very short period of time and the product is in that manner improved. Yet another case, in which this inventor is a co-inventor with John Ross, is Serial Number 218,018, filed July 7, 1938, and in this application the manufacture of products from coal tar or shale oil hydrocarbons by a generally similar process is described.

Particularly in connection with the invention described in the present application, but also in connection with other processes of this general nature, it has been found highly desirable to provide a method and apparatus by the use of which sulphonation can be performed on a commercial scale, with great rapidity and high efficiency, and yet in such a manner that the products which result will be of exceptionally good quality.

According to the present invention it has been discovered that the materials to be sulphonated and the sulphonating agent can be separately cooled before they are contacted by dissolving each in a quantity of liquid sulphur dioxide, and then separately precooling, and that with these materials so precooled they can be brought directly into confluence in a zone which is refrigerated. The temperature can then be allowed to rise somewhat while the materials are being flowed for a sufficient time and in such a path as to thoroughly complete the mixing and the reaction. By this procedure the mixing and reaction can be accomplished in an extremely short period of time, and water can then be brought into confluence with the mixture to stop the action of the sulphonating agent so that side reactions such as undesirable polymerization, condensation, oxidation, and the like may be avoided, or minimized.

Naturally, all of these steps must be accomplished under pressure in order to keep the sulphur dioxide in liquid form, and the major portion of the sulphur dioxide can be separated and recovered without appreciable decompression by utilizing the heat of solution of the sulphonating agent to drive off the sulphur dioxide, preferably in a plurality of steps at gradually reduced pressure. What sulphur dioxide is not recoverable in this manner may be removed by vacuum, dried, and returned to storage.

A large part of the water and sulphonating agent may be removed from the sulphonic acid by decantation, after which the sulphonic acids are preferably washed with a low boiling hydrocarbon solvent and neutralized, all in a continuous process. The solvent itself may be recovered by washing with an alkaline solution, then with water, and finally distilling.

By proper arrangement of the system, the cooling may be effected by the evaporation of a portion of the same liquid sulphur dioxide that is used as a solvent in the reaction, and all of this sulphur dioxide may be recovered for further use. Thus the latter stages of the reaction between the sulphonating agent and the hydrocarbon material may be carried on in a tube surrounded by liquid sulphur dioxide at a pressure that will permit enough sulphur dioxide to evaporate to keep the temperature at between $+5°$ C. and $-5°$ C. A portion of the liquid sulphur dioxide at this temperature may be continuously withdrawn and passed to the zone surrounding the tubes containing the sulphonating agent-liquid sulphur dioxide mixture and the hydrocarbon material-liquid sulphur dioxide mixture and the tube in which these materials are first brought into confluence. In that zone the pressure may be further reduced to obtain a lower temperature, say, $-10°$ C. to $-20°$ C. A portion of the liquid sulphur dioxide from this zone may be withdrawn and passed into the tubes in which the sulphonating agent and hydrocarbon material are brought to the reaction zone so that it will dilute the materials and precool them. The sulphur dioxide that is vaporized can be recompressed and condensed to put it back in liquid form.

The materials which are preferably sulphonated by this process are mineral oil extracts comprising the more aromatic and unsaturated aliphatic constituents of mineral oils. These extracts may or may not be preliminarily processed according to the procedure outlined in the U. S. Patent No. 2,149,662, noted above, depending on the quality of the product desired. Coal tar oil and shale oil fractions may also be efficiently sulphonated by this method.

Various other materials may be added to the mineral oil extract before sulphonation including carbocyclic compounds such as naphthenes, phenols, cyclo-olefines, indene and cymene; mono- and poly-olefines and olefinic extracts, saturated and unsaturated aliphatic compounds such as mono- and poly-hydric alcohols, mono- and poly-basic acids and esters thereof; and heterocyclic compounds such as coumarone, furfural, piperidine and pyridine or mixtures of any of these materials.

If the extract used is olefinic in nature, the addition compounds are usually of the aromatic type such as phenols, indene, naphthalene and benzene. If the extract is more aromatic, then the addition compounds are preferably aliphatic such as olefinic extracts, tri-isobutylene, dodecene, linseed oil, and mixtures of glycerine and fatty acids.

As can readily be seen, the process has numerous new and unusual features which are subject to considerable variation. A better understanding of the invention can be obtained by a consideration of the following specific example.

According to a preferred method of operation, as shown in the accompanying flow sheet, oleum is held in tank 1, a mineral oil extract is stored in tank 2 and liquid sulphur dioxide is held in tank 3. Strong oleum held in tank 1 at room temperature is passed in regulated quantities by pump 4 through lines 5 and 6 into precooling coil 7. The acid feed, before entering the precooling coil, is diluted and dropped in temperature by cold liquid sulphur dioxide fed in regulated quantities through pump 8 and line 9.

Mineral oil extract held in tank 2 at room temperature is passed in regulated quantities by pump 10 through lines 11 and 12 into precooling coil 13. The oil feed is diluted and dropped in temperature before entering the precooling coil by cold liquid sulphur doixide fed in regulated quantities by pump 14 through lines 15 and 12.

The oleum-liquid sulphur dioxide solution and the mineral oil extract-liquid sulphur dioxide solution are thus separately cooled to about −10° C. by passage through precooling coils 7 and 13, respectively. The two streams are now mixed in low temperature reaction coil 16. There is an evolution of heat at the contacting of the two streams and during the subsequent reaction period; hence, it is desirable that the reaction chamber be cooled and the reaction maintained at temperatures in the neighborhood of −10° C. This temperature control, and that of the precooling coils, is obtained in a manner to be hereinafter described.

The reaction mass passes from the initial or low temperature reaction coil 16 into a secondary or medium temperature reaction coil 17 held in cooler 18. Coil 17 operates advantageously at a temperature of about +5° C.

The refrigerating cycle necessary for maintaining the proper temperature in precooling coils 7 and 13 and in low and medium temperature reaction coils 16 and 17 may be described as follows:

Liquid sulphur dioxide held in storage tank 3 at room temperature passes by reason of its relatively high vapor pressure through line 19 through valve 20 into the top of cooler 18. The vapor space of cooler 18 is connected by lines 21 and 22 to the inlet side of compressor 23. Regulation of the temperature of the liquid sulphur dioxide in tank 18 is maintained by valve 24. This valve is actuated automatically by thermostat 25 which measures, and helps to maintain substantially constant, the temperature of the reaction masses discharged from medium temperature reaction coil 17 because of its control of valve 24. Thus, if the temperature of the reaction mass tends to rise, valve 24 opens and the vapor pressure in cooler 18 drops because compressor 23 is of sufficient capacity to maintain a pressure drop across valve 24 at all times. Valve 20 in line 19 may be operated by a float in tank 18 so as to maintain a substantially constant level of liquid sulphur dioxide therein. As the pressure maintaining in tank 18 is somewhat lower than the pressure in tank 3, there is evaporation of some liquid sulphur dioxide on passing valve 20, with consequent cooling effect in addition to the cooling caused by evaporation of sulphur dioxide through valve 24.

Although the reaction is herein described as being carried out in two zones 16 and 17, the apparatus and process may be modified to permit the reaction of organic compounds and sulphonating agents in a single zone at desired, regulated temperatures.

Liquid sulphur dioxide now cooled to around +5° C. passes from cooler 18 by means of line 26 through valve 27 to the vapor space of chiller tank 28 because the vapor pressure in cooler 18 is higher than in chiller tank 28, as will be shown. Chiller tank 28 maintains coils 7, 13 and 16 at the proper temperatures. The vapor space of chiller tank 28 is connected by means of line 29 to the inlet-side of low stage sulphur dioxide gas compressor 30. Float control valve 27 maintains the liquid sulphur dioxide level in chiller tank 28 so that coils 7, 13 and 16 will be covered by liquid sulphur dioxide. The temperature of the liquid sulphur dioxide is held at a desired temperature by thermostat 31 which, cooperating with valve 32, thus maintains a substantially constant pressure and temperature in chiller tank 28. Gas compressor 30 discharges its load to the inlet-side of compressor 23 by means of lines 33 and 22.

The mixture discharged from medium temperature reaction coil 17 in cooler 18 requires immediate dilution with water to prevent further and undesirable chemical action. Fresh water pump 34 maintains a regulated flow of water to mixing nozzle 35. Fresh water from any convenient source is fed to pump 34 through line 36.

The heat of dilution of the sulphuric acid is very considerable and advantage is taken of this fact to furnish part of the terminal requirements for recovering the solvent sulphur dioxide for reuse in the system. The process provides multiple stage evaporation, as shown by evaporators 37, 38, 39 and 40.

The hot mixture resulting from nozzle 35, entering evaporator 37 loses a portion of its liquid sulphur dioxide therein through evaporation due to an increase in temperature caused by the dilution of the sulphuric acid. The vapors of sulphur dioxide thus evolved pass through line 41 and heat exchanger 42 where they are cooled and liquefied and drop into tank 43. The liquid mixture flowing from evaporator 37 passes through regulating valve 44 which permits a reduction in pressure and a consequent further evaporation of liquid sulphur dioxide from the liquid to vapor form with simultaneous cooling thereof as it passes through indirect heat exchanger 42 to evaporator 38. The sulphur dioxide thus liquefied in heat exchanger 42 and running to tank 43 may be further cooled, to prevent re-evaporation, by a cooler 45 before passing through a float controlled valve 46, through line 47 to storage tank 3. As the pressure in evaporator 37 is preferably maintained at a pressure somewhat above that in tank 3, the return of liquid sulphur dioxide to tank 3 may be by gravity. The sulphur dioxide vapors passing through pipe 41 may be dried by suitable means, not shown, before liquefaction.

The vapor space of evaporator 38, which operates at a lower pressure than evaporator 37, is connected to condenser 48 by means of line 49. This may be through a suitable drying device not shown. Control valve 50 regulates the liquid level in evaporator 38 and permits a controlled rate of discharge of the liquid out of evaporator 38 into evaporator 39.

Evaporator 39 operates under lower pressure than evaporator 38. Its vapor space is connected to the inlet-side of compressor 23 by means of lines 51 and 22. The sulphur dioxide vapor discharged by evaporator 39 passes through a dehydrator (not shown), wherein any water that may be present is removed.

The latent heat of evaporation required in evaporators 38, 39 and 40 for volatilization of sulphur dioxide is supplied by heaters 52, 53 and 54 located therein, which are supplied with heat from any suitable source.

Evaporator 40 provides the last and lowest pressure stage of evaporation. This evaporator operates under sub-atmospheric pressure and permits the sulphur dioxide vapor separated from the reaction mass therein to pass through lines 55 and 29 to the inlet-side of gas compressor 30. These vapors may also be dried before compressing by a suitable means not shown. Compressor 23 discharges compressed sulphur dioxide vapors to water cooled condenser 48 where the sulphur dioxide vapors are condensed to liquid sulphur dioxide, which then passes to storage tank 3 for reuse. Control valve 56 regulates the flow of liquid from evaporator 39 into evaporator 40.

The substantially sulphur dioxide free residue left in evaporator 40 is now ready for further processing. It may consist of a mixture of about 40 per cent sulphuric acid and 60 per cent of a mixture consisting of sulphonic and sulphuric acids, unsulphonated hydrocarbons and water. The 40 per cent sulphuric acid readily separates on standing from the above described mixture and this is accomplished as follows:

Evaporator 40 is connected through float control valve 57 and pump 58 to settling tank 59, thus permitting transfer of the residue remaining in evaporator 40 to settling tank 59. This tank is of such a size that sufficient time is allowed for the liquid mixture to separate into two layers in its passage therethrough. A lower layer which may consist of 40 per cent sulphuric acid passes out of the tank by means of line 60. Valve 61 maintains the level in tank 59 at the desired point, by means of a suitable automatic regulating device, such as a photoelectric cell. The concentrated solution of sulphur dioxide-free sulphonic acids is discharged from the top of settling tank 59 and passes through line 62 to cooler 63. The discharge from cooler 63 passes to the top of vertical extraction tower 64 where it is freed from unsulphonated hydrocarbons by means of countercurrent extraction with low boiling hydrocarbons.

The countercurrent extraction is performed by means of solvent scrubbing and is so arranged that recovery of the solvent for recycling in the system is carried out in a continuous manner.

Low boiling hydrocarbon solvent (96° C. endpoint) held in storage tank 65 is passed by pump 66 and line 67 to near the bottom of extraction tower 64. The flow of solvent is regulated as desired by suitable means. After entering near the bottom of extraction tower 64, the solvent rises to the top of the tower and extracts the unsulphonated hydrocarbons from the descending stream of sulphonic acids. The solution of hydrocarbon oil and solvent next requires neutralization with caustic soda and washing with water previous to the distillation for the recovery of the solvent.

Accordingly, the solution of oil is discharged from the top of extractor 64 and passes through line 68 to near the bottom of countercurrent caustic neutralizer 69 where it meets a descending stream of caustic soda fed into neutralizer 69 near the top, by line 70. In this neutralizer 69 any traces of acid held in the solution of oil are removed by the caustic soda. Valve 71 is provided at the bottom of neutralizer 69 for removal of the aqueous solution as desired. Valve 71 also maintains the interface at the desired level in neutralizer 69. This can be near the bottom of neutralizer 69 or, alternatively, near the top. Valve 72 controls the rate of flow of caustic soda from storage tank 90 through pump 73 and line 70 into extraction tower 69. The acid-free oil solution next requires a water wash to free it from traces of caustic.

It passes out of the top of neutralizer 69 through line 74 to near the bottom of water scrubber 75. Here it meets a descending stream of water supplied to scrubber tower 75 by means of line 76. The water passes out of tower 75 through valve 77 which maintains the water level at the desired point in tower 75. The neutral solution of oil, after passing upward through the tower, is discharged from the top through line 78 to distilling column 79 where the solvent is separated from the unsulphonated hydrocarbon oil.

The separation of the solvent as vapors is accomplished by steam distillation; the steam being supplied in part by the operation of sulphonate neutralizer 80 to be described later, or from any suitable source. Steam on leaving the neutralizer passed by means of line 81 to distilling column 79 through regulating valve 82. Tank 80 is also provided with a pressure relief valve 83. Line 84 provides an auxiliary supply of steam from an outside source not shown. The low boiling solvent is vaporized, passes out of the top of distilling column 79 and from this point is conducted to cooling condenser 85 where the steam and solvent vapors are liquefied and then pass to collector tank 86. The solvent separates from the water in tank 86 and passes out of the top thereof through line 87 to solvent storage tank 65 for reuse. Valve 88 regulates the water level in receiver 86 and permits the water layer to be withdrawn.

The stripped remaining oil collects in the bottom of distilling column 79 and may be transferred therefrom to tank 89.

Strong caustic soda tank 91 is connected to pump 93 by line 92. Pump 93 feeds neutralizer 80 through line 94. The flow of caustic soda to neutralizing tank 80 is regulated by suitable means. The oil-free sulphonic and sulphuric acids discharged from the bottom of extraction tower 64 are fed to neutralizer 80 by pump 95 through lines 96 and 94 and the flow is regulated by control valve 97. In neutralizer 80 a concentrated solution of the sodium salts of the sulphonic and sulphuric acids is formed. The heat of reaction between the sulphonic-sulphuric acids and neutralizing agent is very considerable. By holding neutralizer 80 under a little pressure, its temperature may be held above 100° C. Whatever solvent is left in the solution is removed by evaporation along with steam. It passes through line 81 to distillation tower 79. Pumps 93 and 95 regulate the operation of the neutralizer 80. A steam coil 98 may be located within the neutralizer 80 to provide additional heat, if required.

The hot concentrated product formed in neutralizer 80, which is the desired product, may be run off as desired through valve 99 into tank 100.

The water solution of solvent-free and neutralized sulphonated extract and inorganic sulphate may be collected in a reservoir 100 and/or introduced into a spray drying apparatus (not shown), such, for example, as that completely described in the Lamont Patent No. 1,652,900 of December 13, 1927, or may be dried by other recognized means. The discharge from this equipment is a dried powder containing approximately 60% active ingredient (sulphonate) and 40% sodium sulphate.

This process combines the indirect method of cooling with the economical method of sulphur dioxide recovery. The sulphur dioxide is maintained in a single closed system at all times; hence, there is little or no loss, and by the efficient method of heat interchanging very appreciable economy is effected.

It should be noted that all possible variations have not been described and numerous other details are apparent to one skilled in the art. Many details have not been mentioned because they are common knowledge and add little to the disclosure.

Each individual apparatus may advantageously be interconnected with a manifold leading to the low stage gas compressor, and to the condenser. In this manner sulphur dioxide gas under any desired pressure may be applied and this permits complete control, viz., for cleaning out purposes, etc.

In addition to the materials which have been specifically mentioned hereinbefore for process according to this invention, it is to be understood that this process is to be equally applicable to all sulphonatable materials which are soluble in liquid sulphur dioxide.

Many of the features of the above described processes and apparatus may be altered or omitted without departing from the broad scope of the invention.

I claim:

1. The continuous process of sulphonation which comprises continuously dissolving oleum and hydrocarbons including a substantial proportion of constituents of an unsaturated nature, including constituents of aromatic nature, in separate portions of liquid sulphur dioxide, flowing each portion in a stream through separate pre-cooling zones, combining the streams in a reaction zone where the reaction temperature is maintained at a sub-atmospheric, comparatively low sulphonation temperature, continuously flowing the reacting mass into a second reaction zone maintained at a sulphonation temperature higher than the first zone to substantially complete the reaction, diluting the reaction mass emerging from the second reaction zone with water, evaporating the sulphur dioxide from said diluted reaction mass, separating the solution containing the sulphonated products from said diluted reaction mixture, neutralizing the acid solution containing said sulphonated products with a base and drying to form a solid sulphonate product.

2. A process for continuous sulphonation of organic compounds of an unsaturated nature, including compounds of aromatic nature, which comprises dissolving a sulphonating agent and said organic compounds in separate portions of liquid sulphur dioxide with separate mixing zones, flowing said solutions into confluence in zones of reaction to form a reacting mass, cooling said reacting mass to a sub-atmospheric sulphonation temperature, diluting the reaction mass with water within a mixing zone to stop undesirable chemical action, removing liquid sulphur dioxide from the reaction mass as a vapor in zones of evaporation, removing sulphonic acids from the substantially sulphur dioxide-free reaction mass within a settling zone, dissolving unsulphonated material from said sulphonic acids by counter-current action with a low boiling inert solvent, treating said sulphonic acids with regulated quantities of a solution of an alkaline substance to form a strong aqueous solution of the salts of the sulphonic acids, and drying the aqueous solution containing the sulphonated product.

3. A process for continuous sulphonation of mineral oil extracts obtained by solvent extracting mineral oils with a preferential solvent which tends to dissolve certain constituents of the oil and not to dissolve others, the constituents which the solvent tends to dissolve being generally those of an unsaturated nature, including those of aromatic nature, which comprises dissolving a sulphonating agent and said mineral oil extracts in separate portions of liquid sulphur dioxide within separate mixing zones, flowing said solutions into confluence within a primary zone of reaction to form a reacting mass, cooling said reacting mass to a sub-atmospheric temperature, completing the reaction in a secondary reaction zone while maintaining therein a low sulphonation temperature which is greater than that within the primary reaction zone, diluting the reaction mass with water to stop undesirable chemical action therein, removing liquid sulphur dioxide from the reaction mass as a vapor in zones of evaporation, removing sulphonic acids from the substantially sulphur dioxide-free reaction mass within a separating zone, dissolving unsulphonated material from said sulphonic acids by counter-current action with a low boiling inert solvent, treating said sulphonic acids with regulated quantities of an alkaline substance to form a strong aqueous solution of the salts of the sulphonic acids, and drying the aqueous solution containing the sulphonate.

4. A process for continuous sulphonation of organic compounds containing a substantial proportion of constituents of an unsaturated nature, including constituents of aromatic nature, which comprises dissolving a sulphonating agent and said organic compounds in separate portions of liquid sulphur dioxide, continuouly flowing said solutions into confluence to form a reacting mass while regulating the temperature thereof to low sub-atmospheric sulphonation temperatures, diluting the reaction mass with water to stop undesirable chemical reaction, evaporating the sulphur dioxide from said reaction mass, and separating the sulphonated products from the reaction mass.

5. The continuous process of sulphonation which comprises continuously dissolving oleum and hydrocarbons containing a substantial proportion of constituents of an unsaturated nature, including constituents of aromatic nature, in separate portions of liquid sulphur dioxide, flowing each portion in a stream through separate pre-cooling zones, combining the streams in a reaction zone where the reaction temperature is maintained at a comparatively low sulphonation temperature, continuously flowing the reacting mass through a second reaction zone maintained at a sulphonation temperature higher than the first zone to substantially complete the reaction, diluting the reaction mass emerging from the second reaction zone with water, evaporating the sulphur dioxide from said diluted reaction mass, separating the solution containing the sulphonated products from said diluted reaction mixture, neutralizing the acid solution containing said sulphonated product with a base and drying to form a solid sulphonate product.

6. The continuous process of sulphonation which comprises continuously dissolving oleum and mineral oils containing a substantial proportion of constituents of an unsaturated nature, including constituents of aromatic nature, in separate portions of liquid sulphur dioxide, flowing each portion in a stream in separate pre-cooling zones, combining the streams in a reaction zone where the reaction temperature is maintained at about −10° C., continuously flowing the reacting mass through a second reaction zone maintained at a temperature of about +5° C. to substantially complete the reaction, diluting the reaction mass emerging from the second reaction zone with water, evaporating the sulphur dioxide from said diluted reaction mass, separating the solution containing the sulphonated products from said diluted reaction mixture, neutralizing the acid solution containing said sulphonated products with a base and drying to form a solid sulphonate product.

7. A process for continuous sulphonation of a mineral oil extract obtianed by solvent extracting mineral oil with a preferential solvent which tends to dissolve certain constituents of the oil and not to dissolve others, the constituents which the solvent tends to dissolve being generally those of an unsaturated nature, including those of aromatic nature, which comprises dissolving oleum and said mineral oil extract in separate portions of liquid sulphur dioxide within separate mixing zones, flowing said solutions into confluence within a primary zone of reaction to form a reacting mass, cooling said primary reaction zone to about −10° C., cooling said reacting mass while completing the reaction in a secondary reaction zone which is maintained at about +5° C., diluting the reaction mass with water within a mixing zone to stop the undesirable chemical action thereof, removing liquid sulphur dioxide from the reaction mass as a vapor in a zone of high pressure evaporation, removing additional liquid sulphur dioxide as a vapor in a zone of subatmospheric pressure, separating the sulphur dioxide free reaction mass into two parts, one of which contains aqueous sulphuric acid and the other, sulphonic acids, dissolving unsulphonated material from said sulphonic acid by counter-current action with a low boiling inert solvent, treating said sulphonic acids with regulated quantities of caustic soda to form a strong aqueous solution of the salts of the sulphonic acids within a neutralizing zone, heating to vaporize any remaining traces of solvent, and drying the aqueous solution of sulphonated extract and by-product sulphate.

8. A process for continuous sulphonation of organic compounds containing a substantial proportion of constituents of an unsaturated nature, which comprises dissolving a sulphonating agent and such an organic compound in separate portions of liquid sulphur dioxide, continuously flowing said solutions into confluence to form a reacting mass while regulating the temperature thereof to low sulphonation temperatures, diluting the reaction mass with water to stop undesirable chemical reaction, evaporating the sulphur dioxide from said reaction mass, and recovering the sulphonated products from the reaction mass.

9. A process for continuous sulphonation of organic compounds containing a substantial proportion of constituents of an unsaturated nature, which comprises dissolving a sulphonating agent and such an organic compound in separate portions of liquid sulphur dioxide, continuously flowing said solutions into confluence to form a reacting mass while maintaining the temperature thereof approximately within the range −20° C. to +5° C., diluting the reaction mass with water to stop undesirable chemical reaction, evaporating the sulphur dioxide from said reaction mass, and recovering the sulphonated products from the reaction mass.

10. A process for continuous sulphonation of a mineral oil extract obtianed by solvent extracting mineral oil with a preferential solvent which tends to dissolve certain constituents of the oil and not to dissolve others, the constituents which the solvent tends to dissolve being generally those of an unsaturated nature, including those of an aromatic nature, which comprises dissolving oleum and said mineral oil extract in separate portions of liquid sulphur dioxide within separate mixing zones, flowing said solutions into confluence within a primary reaction zone in heat exchange relationship with temperature controlling liquid sulphur dioxide to form a reacting mass, cooling said primary reaction zone to about −10° C. by evaporation of said temperature controlling liquid sulphur dioxide, passing said reacting mass to a secondary reaction zone maintained at about +5° C. by evaporation of liquid sulphur dioxide in heat exchange relationship therewith, diluting the reaction mass with water to stop undesirable chemical action thereof, removing liquid sulphur dioxide from the reaction mass as a vapor in a zone of high pressure evaporation, removing additional sulphur dioxide as vapor in a zone of intermediate pressure evaporation, removing additional sulphur dioxide as vapor in a zone of low pressure evaporation, condensing the sulphur dioxide vapor from said zone of high pressure evaporation, collecting and condensing together sulphur dioxide vapor from said secondary reaction zone and said zone of intermediate pressure evaporation, collecting and condensing together sulphur dioxide vapor from said primary reaction zone and said zone of low pressure evaporation, and collecting in a storage zone the sulphur dioxide so condensed.

11. A process for continuous sulphonation of a mineral oil extract obtained by solvent extracting mineral oil with a preferential solvent which tends to dissolve certain constituents of the oil and not to dissolve others, the constituents which the solvent tends to dissolve being generally those of an unsaturated nature, including those of an aromatic nature, which comprises dissolving oleum and said mineral oil extract in separate portions of liquid sulphur dioxide within separate mixing zones, flowing said solutions into confluence within a primary zone of reaction in heat exchange relationship with temperature controlling liquid sulphur dioxide to form a reacting mass, cooling said primary reaction zone to low sulphonation temperature by evaporation of said temperature controlling liquid sulphur dioxide in heat exchange relationship therewith, passing said reacting mass to a secondary reaction zone maintained at a higher sulphonation temperature by evaporation of temperature controlling liquid sulphur dioxide in heat exchange relationship therewith, diluting the reaction mass with water to stop undesirable chemical action thereof, removing liquid sulphur dioxide from the reaction mass as a vapor in a zone of high pressure evaporation, removing additional sulphur dioxide as vapor in a zone of intermediate pressure evaporation, removing additional sulphur dioxide as vapor in a zone of low pressure evaporation, condensing the sulphur dioxide vapor from said zone of high pressure evaporation, collecting and condensing together the sulphur dioxide vapor from said secondary reaction zone and said zone of intermediate pressure evaporation, collecting and condensing together sulphur dioxide vapor from said primary reaction zone and said zone of low pressure evaporation, and collecting in a storage zone the sulphur dioxide so condensed.

12. A process for continuous sulphonation of organic compounds containing a substantial proportion of constituents of an unsaturated nature, which comprises dissolving a sulphonating agent and such an organic compound in separate portions of liquid sulphur dioxide, continuously flowing said solutions into confluence to form a reacting mass while regulating the temperature thereof to low sulphonation temperatures, diluting the reaction mass with water to stop undesirable chemical reaction, evaporating the sulphur dioxide from said reaction mass, and reacting the sulphonated products with an alkaline substance.

13. A process for continuous sulphonation of organic compounds containing a substantial proportion of constituents of an unsaturated nature, which comprises dissolving a sulphonating agent and such an organic compound in separate portions of liquid sulphur dioxide, continuously flowing said solutions into confluence to form a reacting mass while regulating the temperature thereof to low sulphonation temperatures, diluting the reaction mass with water to stop undesirable chemical reaction and evaporating the sulphur dioxide from said reaction mass.

ROBERT L. BRANDT.